United States Patent
Lee et al.

(10) Patent No.: US 12,368,001 B2
(45) Date of Patent: Jul. 22, 2025

(54) ELECTRONIC COMPONENT

(71) Applicant: SAMSUNG ELECTRO-MECHANICS CO., LTD., Suwon-si (KR)

(72) Inventors: Younghun Lee, Suwon-si (KR); Beomjoon Cho, Suwon-si (KR); Gyeong Ju Song, Suwon-si (KR); Won Young Jang, Suwon-si (KR); Jihong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 261 days.

(21) Appl. No.: 17/979,973

(22) Filed: Nov. 3, 2022

(65) Prior Publication Data
US 2023/0178299 A1    Jun. 8, 2023

(30) Foreign Application Priority Data

Dec. 2, 2021  (KR) .................. 10-2021-0170736

(51) Int. Cl.
   *H01G 2/06*     (2006.01)
   *H01G 4/228*    (2006.01)
   *H01G 4/30*     (2006.01)
   *H01G 4/38*     (2006.01)

(52) U.S. Cl.
   CPC .......... *H01G 2/065* (2013.01); *H01G 4/228* (2013.01); *H01G 4/30* (2013.01); *H01G 4/38* (2013.01)

(58) Field of Classification Search
   CPC .......... H01G 2/065; H01G 4/228; H01G 4/30; H01G 4/38; H01G 4/32
   See application file for complete search history.

(56) References Cited

U.S. PATENT DOCUMENTS

| | | | |
|---|---|---|---|
| 7,331,799 B1 * | 2/2008 | Lee ................ | H01G 4/232 361/308.1 |
| 9,117,595 B2 * | 8/2015 | Saito .............. | H01G 4/228 |
| 10,381,157 B2 * | 8/2019 | Ando .............. | H01G 4/1227 |

(Continued)

FOREIGN PATENT DOCUMENTS

| | | |
|---|---|---|
| JP | 2012-023322 A | 2/2012 |
| JP | 6264716 B2 | 1/2018 |

(Continued)

OTHER PUBLICATIONS

Office Action dated Jan. 23, 2025, issued in corresponding Korean Patent Application No. 10-2021-0170736 with an English translation.

*Primary Examiner* — Michael P McFadden
(74) *Attorney, Agent, or Firm* — Morgan Lewis & Bockius LLP (57) ABSTRACT

An electronic component includes a multilayer capacitor including a capacitor body including a dielectric layer and an internal electrode, and an external electrode disposed on one surface of the capacitor body, and a frame terminal having a supporting portion disposed on the external electrode, and a mounting portion disposed at one end of the supporting portion. The supporting portion has a concave portion spaced apart from the mounting portion and having a distance to the mounting portion less than a distance from the capacitor boy to the mounting portion.

21 Claims, 8 Drawing Sheets

(56) References Cited

U.S. PATENT DOCUMENTS

| | | | |
|---|---|---|---|
| 2004/0183147 A1* | 9/2004 | Togashi | H05K 3/3426 |
| | | | 257/414 |
| 2014/0118882 A1 | 5/2014 | Masuda et al. | |
| 2015/0114697 A1* | 4/2015 | Murrell | H01L 23/49861 |
| | | | 174/255 |
| 2015/0296623 A1 | 10/2015 | Trinh | |
| 2016/0086730 A1* | 3/2016 | Park | H05K 3/3426 |
| | | | 361/306.3 |
| 2017/0127520 A1* | 5/2017 | Park | H01G 4/12 |
| 2017/0287645 A1* | 10/2017 | Masuda | H01G 4/248 |
| 2019/0096582 A1* | 3/2019 | Saito | H05K 3/3426 |
| 2020/0194175 A1 | 6/2020 | Cho et al. | |

FOREIGN PATENT DOCUMENTS

| | | |
|---|---|---|
| JP | 2020-064982 A | 4/2020 |
| KR | 10-2019-0121232 A | 10/2019 |

* cited by examiner

ELECTRONIC COMPONENT

CROSS-REFERENCE TO RELATED APPLICATION

This application claims priority to and the benefit of Korean Patent Application No. 10-2021-0170736 filed in the Korean Intellectual Property Office on Dec. 2, 2021, the entire contents of which are incorporated herein by reference.

TECHNICAL FIELD

The present disclosure relates to an electronic component, and more particularly, to a multilayer ceramic capacitor.

BACKGROUND

Electronic components may be down-sized and realize high capacity and thus are used in various electronic devices. Particularly, the electronic components are essentially used for the latest IT devices due to high frequency characteristics and excellent heat resistance.

Recently, with the rapid rise of environmentally-friendly and electric vehicles, as electric power driving systems in automobiles are increasing, the demand for the electronic components such as multilayer capacitors required for the automobiles is increasing.

Since automobile parts are required to have high heat resistance and electrical reliability, the electronic components are also required to have more advanced performance.

Accordingly, there is an increasing demand for electronic components capable of realizing high capacity in a limited space or having excellent durability against vibration and deformation.

However, since the conventional electronic components are mounted directly on a board, heat or deformation generated from the board is directly transmitted to the electronic components, failing in securing reliability. Accordingly, a method of protecting the electronic components by bonding a metal frame at the sides thereof to secure a distance between electronic components and the board and thus absorb the heat or deformation by the metal is suggested.

However, in the electronic component bonded to the metal frame, the electronic component and the metal frame come into direct contact with the solder, so that the flux component included in the solder dissolves the glass component included in the external electrode of the electronic component and moisture penetrates and spreads to the capacitor body, causing IR degradation of electronic components and making it difficult to secure a high level of reliability.

In addition, side surfaces of the electronic component facing the board are also deteriorated by the flux of solder used when the metal frame is mounted on the board in addition to the flux of the solder used for bonding the metal frame and the electronic component.

SUMMARY

An embodiment provides an electronic component capable of securing high reliability without increasing a distance between a lower portion of a multilayer capacitor and a board mounting portion, increasing acoustic noise, and reducing a fixing force.

An electronic component according to an embodiment includes: a multilayer capacitor including a capacitor body including a dielectric layer and an internal electrode, and an external electrode disposed on one surface of the capacitor body; and a frame terminal having a supporting portion disposed on the external electrode and a mounting portion disposed at one end of the supporting portion.

The supporting portion may have a concave portion spaced apart from the mounting portion and having a distance to the mounting portion less than a distance from the capacitor boy to the mounting portion.

The concave portion may be disposed between the mounting portion and another surface of the capacitor body directly facing the mounting portion.

The concave portion may be disposed on a surface facing the multilayer capacitor of the supporting portion.

An average height of the concave portion may be about 4% to about 40% relative to an average height of the capacitor body.

The electronic component may include a conductive bonding portion disposed between the external electrode and the frame terminal.

The concave portion may extend between an area in contact with the conductive bonding portion of the supporting portion and the mounting portion.

The concave portion may divide an area in contact with the conductive bonding portion of the supporting portion and the mounting portion.

The concave portion may have a shape inclined downward in an edge area not in contact with the conductive bonding portion of the supporting portion.

The concave portion may be an area in which the surface of the supporting portion is recessed.

The concave portion may have a shape in which a width is greater than a depth.

An average width of the concave portion may be about 8% to about 40% relative to an average thickness of the capacitor body.

The frame terminal may include a base portion and a plating portion disposed on a surface of the base portion.

The plating portion may include portions separated by the concave portion.

The plating portion may include Sn or an alloy including Sn as a main component.

The conductive bonding portion may include solder or a conductive resin paste.

An electronic component according to another embodiment includes: first and second multilayer capacitors including a capacitor body including a dielectric layer and an internal electrode, and an external electrode disposed on one surface of the capacitor body; and a frame terminal having a supporting portion disposed on the external electrodes, and a mounting portion disposed at one end of the supporting portion.

The supporting portion may have a first concave portion spaced apart from the mounting portion and having a distance to the mounting portion less than a distance from the capacitor boy to the mounting portion.

The concave portion may be disposed between the mounting portion and the other surface of the capacitor body disposed closest to the mounting portion.

The electronic component may include conductive bonding portions disposed between the external electrodes and the frame terminal.

The supporting portion may further include a second concave portion disposed between the areas in contact with the conductive bonding portions.

The supporting portion may further include a third concave portion disposed on an area in contact with the conductive bonding portion disposed farthest from the mounting portion.

One or more of the concave portions may extend between an area in contact with the conductive bonding portion of the supporting portion and the mounting portion.

The one or more of the concave portions may have a shape inclined downward in an edge area not in contact with the conductive bonding portion of the supporting portion.

An average width of one of the first and second concave portions may be about 8% to about 40% relative to an average thickness of the capacitor body.

The frame terminal may include a base portion and a plating portion disposed on a surface of the base portion.

The plating portion may include portions separated by the concave portion.

In the electronic component according to the embodiments, when the frame terminal is mounted on the board, the flux component of the solder riding up on the board mounting portion of the frame terminal is constrained to the frame terminal and a flow thereof is suppressed, so that it is possible to prevent IR deterioration of the side surfaces of the multilayer capacitor facing the substrate due to the diffusion of the flux, and high reliability may be secured without increasing the distance between the lower portion of the multilayer capacitor and the board mounting portion, increasing acoustic noise, and reducing a fixing force.

DETAILED DESCRIPTION

The present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. Further, the accompanying drawings are provided only in order to allow embodiments disclosed in the present specification to be easily understood, and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected," "coupled," or "opposed" to another constituent element, it may be connected, coupled, or opposed directly to the other constituent element or may be connected, coupled, or opposed to the other constituent element with a further constituent element intervening therebetween. In contrast, it should be understood that, when it is described that an element is "directly connected," "directly coupled," or "directly opposed" to another element, no element is present between the element and the other element.

Throughout the specification, it should be understood that the term "include", "comprise", "have", or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

Figure 1:
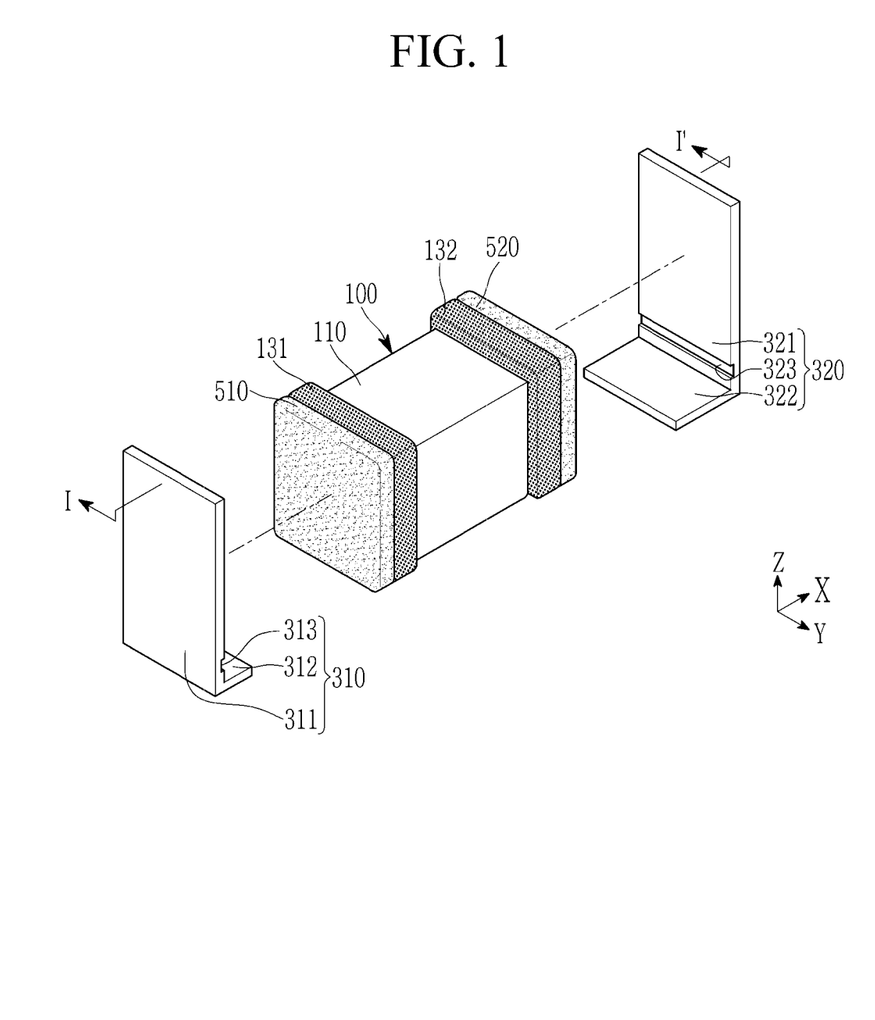
FIG. 1 is a partially exploded perspective view illustrating an electronic component according to an embodiment.
Figure 2:
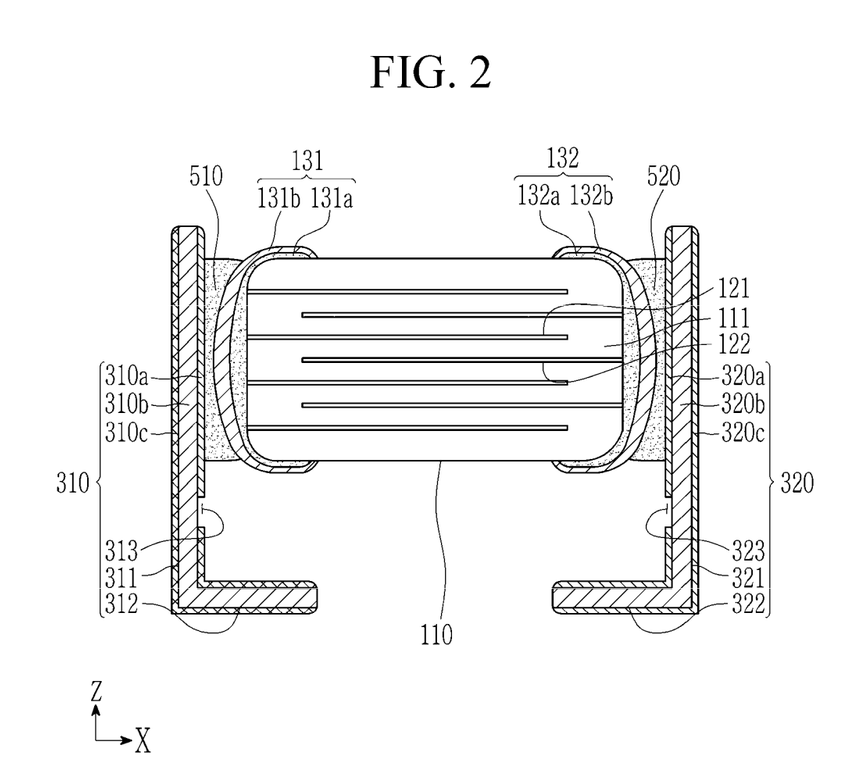
FIG. 2 is a cross-sectional view of the electronic component taken along line I-I' of FIG. 1.
Figure 3:
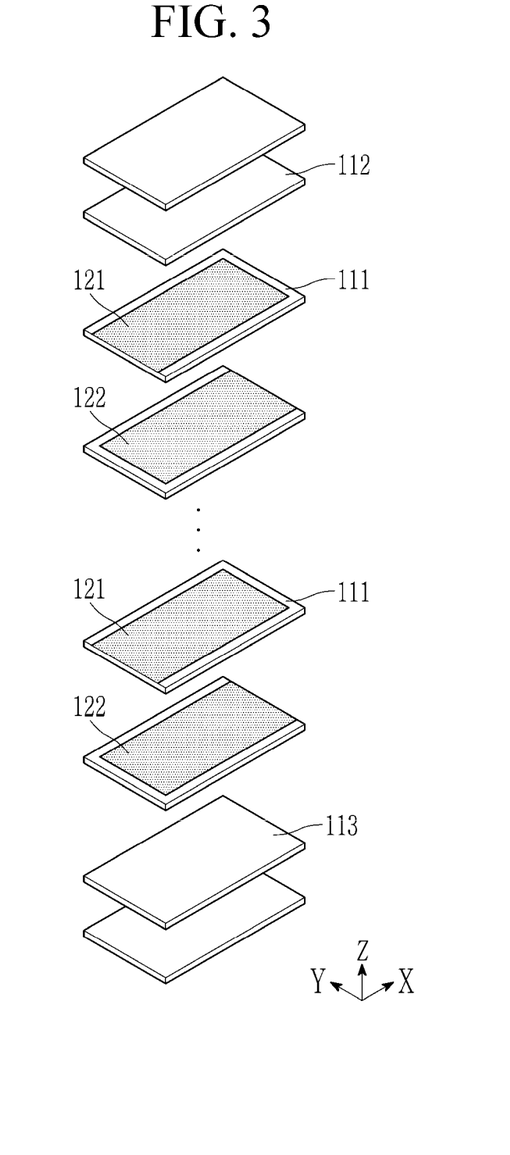
FIG. 3 is an exploded perspective view illustrating a stacked structure of internal electrodes in the multilayer capacitor of FIG. 1.
Figure 4:
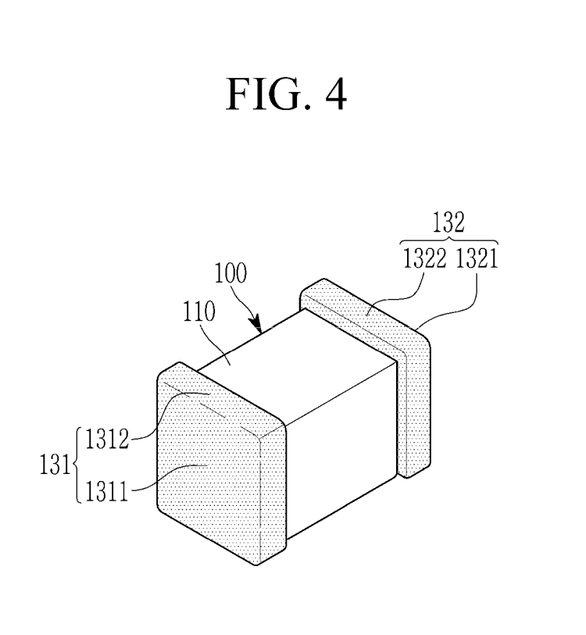
FIG. 4 is a perspective view illustrating the multilayer capacitor of FIG. 1.

FIG. 1 is a partially exploded perspective view illustrating an electronic component according to an embodiment, FIG. 2 is a cross-sectional view of the electronic component taken along line I-I' of FIG. 1, FIG. 3 is an exploded perspective view illustrating a stacked structure of internal electrodes in an electronic component according to an embodiment, and FIG. 4 is a perspective view illustrating the multilayer capacitor of FIG. 1.

In order to clearly describe the present embodiment, X, Y, and Z directions in the drawings are respectively defined as a length direction, a width direction, and a thickness direction of a capacitor body 110. Herein, the thickness direction may be used in the same concept as a stacking direction in which dielectric layers 111 are stacked. The X direction may be defined as an approximately perpendicular direction to the Z direction, and the Y direction may be defined as an approximately perpendicular direction to the Z direction.

Referring to FIGS. 1 to 4, an electronic component according to the present embodiment includes a multilayer capacitor 100, first and second frame terminals 310 and 320, and first and second conductive bonding portions 510 and 520.

The multilayer capacitor 100 includes the capacitor body 110 and first and second external electrodes 131 and 132 disposed at both ends of the capacitor body 110 which face each other in the X direction.

The capacitor body 110 is formed by stacking a plurality of the dielectric layers 111 in the Z direction and then firing them, and includes the plurality of dielectric layers 111 and a plurality of first and second internal electrodes 121 and 122 alternately interposed therebetween in the Z direction.

In addition, covers 112 and 113 may be formed at both ends of the capacitor body 110 in the Z direction.

Herein, each dielectric layer 111 adjacent to the capacitor body 110 may be integrated too closely to distinguish boundaries.

For example, this capacitor body 110 may have a substantially hexahedral shape.

In the present embodiment, for better understanding and ease of description, both surfaces of the capacitor body 110 facing each other in the Z direction are defined as first and second surfaces, both surfaces thereof facing each other in the X direction and connected to the first and second surfaces are defined as third and fourth surfaces, and both of surfaces connected to the first and second surfaces and also to the third and fourth surfaces and facing each other in the Y direction are defined as fifth and sixth surfaces. For example, the first surface, which is a bottom surface, may be a surface facing a mounting direction.

For example, the dielectric layer 111 may include a ceramic material with a high dielectric constant. For example, the ceramic material may include a dielectric material ceramic including a component such as $BaTiO_3$, $CaTiO_3$, $SrTiO_3$, $CaZrO_3$, or the like. In addition, in addition to these components, auxiliary components such as an Mn compound, an Fe compound, a Cr compound, a Co compound, an Ni compound, and the like may be further included For example, $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like in which Ca and Zr are partially dissolved in a $BaTiO_3$-based dielectric material ceramic may be included.

In addition, in the dielectric layer 111, a ceramic additive, an organic solvent, a plasticizer, a binder, a dispersing agent, and the like along with the ceramic powder may be further added. The ceramic additive may be, for example, a transition metal oxide or a transition metal carbide, a rare earth element, magnesium (Mg), aluminum (Al), or the like.

For example, the dielectric layer 111 may have an average thickness of about 0.5 μm to about 10 μm. The phrase, a parameter of "about" a value, may mean the parameter being the value, and may also mean that the parameter is within a range from the value−Δ to the value+Δ, in which Δ represents a process error or a measurement error recognizable by one of ordinary skill in the art.

The first and second internal electrodes 121 and 122 are electrodes having different polarities, alternately disposed to face each other in the Z direction with the dielectric layer 111 in the middle, and one ends thereof may be exposed through the third and fourth surfaces of the capacitor body 110.

The first and second internal electrodes 121 and 122 may be electrically insulated by the dielectric layer 111 disposed in the middle.

The ends of the first and second internal electrodes 121 and 122 alternately exposed through (or being in contact with or extending from) the third and fourth surfaces of the capacitor body 110 may be electrically connected respectively to the first and second external electrodes 131 and 132.

The first and second internal electrodes 121 and 122 may include a conductive metal, for example, a metal such as Ni, Cu, Ag, Pd, Au, and the like or an alloy thereof, for example, an Ag—Pd alloy.

For example, the first and second internal electrodes 121 and 122 may include dielectric material particles having the same composition as the ceramic material included in the dielectric layer 111.

For example, the first and second internal electrodes 121 and 122 may have an average thickness of about 0.1 μm to about 2 μm.

According to the above configuration, when a predetermined voltage is applied to the first and second external electrodes 131 and 132, charges are accumulated between the first and second internal electrodes 121 and 122. Herein, capacitance of the multilayer capacitor 100 is proportional to an overlapped area of the first and second internal electrodes 121 and 122 overlapped along the Z direction.

The first and second external electrodes 131 and 132 may be provided with voltages having different polarities and electrically connected to the exposed portions of the first and second internal electrodes 121 and 122, respectively.

The first and second external electrodes 131 and 132 may respectively include first and second connection portions 1311 and 1321 disposed on the third and fourth surfaces of the capacitor body 110 and respectively connected to the first and second internal electrodes 121 and 122, and also first and second band portions 1312 and 1322 disposed at corners where the first and second surfaces of the capacitor body 110 meet the third and fourth surfaces thereof.

The first and second band portions 1312 and 1322 may extend from the first and second connection portions 1311 and 1321 to portions of the first and second surfaces of the capacitor body 110, respectively. The first and second band portions 1312 and 1322 respectively may further extend from the first and second connection portions 1311 and 1321 to the portions of the fifth and sixth surfaces of the capacitor body 110.

The first and second external electrodes 131 and 132 may respectively include first and second base electrodes in contact with the capacitor body 110, and also first and second terminal electrodes respectively covering the first and second base electrodes.

The first and second base electrodes may include copper (Cu). Alternatively, the first and second base electrodes may include a conductive paste including copper (Cu) as a main component, one or more materials of nickel (Ni), tin (Sn), palladium (Pd), platinum (Pt), gold (Au), silver (Ag), tungsten (W), titanium (Ti), lead (Pb), or an alloy thereof, and glass.

For example, the first and second base electrodes may be formed in a method of dipping the capacitor body 110 in a conductive paste including a conductive metal and glass, printing the conductive paste on the surface of the capacitor body 110 through screen printing, gravure printing, or the like, and coating the conductive paste on the surface of the capacitor body 110, or transferring a dry film formed by drying the conductive paste onto the capacitor body 110.

The first base electrode and the second base electrode are formed of the above conductive paste and thus may increase density of the first and second external electrodes 131 and 132 due to the glass added thereto as well as maintain sufficient conductivity, and thereby effectively suppress penetration of a plating solution and/or external moisture.

For example, the glass component included in the first base electrode and the second base electrode may have a composition in which oxides are mixed, and the metal oxides may be one or more selected from a silicon oxide, a boron oxide, an aluminum oxide, a transition metal oxide, an alkali metal oxide, and an alkali earth metal oxide. The transition metal may be selected from zinc (Zn), titanium (Ti), copper (Cu), vanadium (V), manganese (Mn), iron (Fe), and nickel (Ni), the alkali metal may be at least one selected from lithium (Li), sodium (Na), and potassium (K), and the alkaline earth metal may be at least one selected from magnesium (Mg), calcium (Ca), strontium (Sr), and barium (Ba).

For example, the first and second terminal electrodes may include nickel (Ni) as a main component, and may further include copper (Cu), tin (Sn), palladium (Pd), platinum (Pt), gold (Au), silver (Ag), tungsten (W), titanium (Ti), or lead (Pb) alone or an alloy thereof. The first and second terminal electrodes may improve mountability of the multilayer capacitor 100 on a board, structural reliability, external durability, heat resistance, and equivalent series resistance (ESR).

For example, the first and second terminal electrodes may be formed through plating. The first and second terminal electrodes may be formed through sputtering or electroplating (electric deposition).

The multilayer capacitor 100 may be disposed between the first and second supporting portions 311 and 321. For example, the first and second supporting portions 311 and 321 are respectively disposed outside of the first and second external electrodes 131 and 132 in the X direction.

The first frame terminal 310 includes a first supporting portion 311 extended in the Z direction and a first mounting portion 312 extended from a lower end of the first supporting portion 311 in the X direction.

The second frame terminal 320 includes a second supporting portion 321 facing the first supporting portion 311 and extended in the Z direction and a mounting portion 322 extended from a lower end of the second supporting portion 321 in the X direction.

According to this structure, the first and second frame terminals 310 and 320 may largely have an 'L' shape, and each end of the first and second frame terminals 310 and 320 may be disposed to face each other in the X direction.

The first frame terminal 310 includes a first base portion 310b made of a base material, a first inner plating portion 310a disposed on a surface in which the first base portion 310b faces the first external electrode 131 of the multilayer capacitor 100, and a first outer plating portion 310c disposed on a surface opposite to the first inner plating portion 310a.

Similarly, the second frame terminal 320 includes: a second base portion 320b made of a base material, a second inner plating portion 320a disposed on a surface of the multilayer capacitor 100 in which the second base portion 320b faces the second external electrode 132, and a second outer plating portion 320c disposed on a surface opposite to the second inner plating portion 320a.

The first and second base portions 310b and 320b of the first and second frame terminals 310 and 320 may be formed of a base material including Ni, Fe, Cu, Ag, Cr, or an alloy thereof. For example, the first and second base portions 310b and 320b may be formed of an Fe-42Ni alloy or an Fe-18Cr alloy. For example, the first and second base portions 310b and 320b may have an average thickness of about 0.05 mm to about 0.5 mm.

The first inner plating portion 310a and the first outer plating portion 310c may include a lower plating portion and an upper plating portion, respectively. Similarly, the second inner plating portion 320a and the second outer plating portion 320c may include a lower plating portion and an upper plating portion, respectively.

The lower plating portion may be disposed on the first and second base portions 310b and 320b, and the upper plating portion may be disposed on the lower plating portion. Each of the lower plating portion and the upper plating portion may include a plurality of plating portions.

The lower plating portion may include Ni, Fe, Cu, Ag, Cr, or an alloy thereof, and the upper plating portion may include Sn, Ag, Au, or an alloy thereof. That is, a material of the lower plating portion may be different from a material of the upper plating portion. For example, when the upper plating portion includes Sn or an alloy including Sn as a main component, solder wettability of the first and second frame terminals 310 and 320 may be improved and thus may be greatly different from that of first and second concave portions 313 and 323. That is, when the first and second frame terminals 310 and 320 are bonded with the multilayer capacitor 100 by a solder, the solder may be moved to the first and second inner plating portions 310a and 320a having larger wettability and prevented from being diffused into the multilayer capacitor 100.

In addition, when the lower plating portion includes Ni, Fe, Cr, or an alloy thereof having a higher melting point than that of the upper plating portion, heat resistance of the first and second frame terminals 310 and 320 may be improved.

For example, the lower plating portions may have an average thickness of about 0.2 μm to about 5.0 μm, and the upper plating portions may have an average thickness of about 1.0 μm to about 5.0 μm. In one example, the average thickness of the lower plating portion may be different from that of the upper plating portion.

The first and second external electrodes 131 and 132 of the multilayer capacitor 100 respectively are electrically connected to the first and second frame terminals 310 and 320. For this connection, the electronic component includes first and second conductive bonding portions 510 and 520.

The first conductive bonding portion 510 is disposed between the first external electrode 131 and the first frame terminal 310, while the second conductive bonding portion 520 is disposed between the second external electrode 132 and the second frame terminal 320.

For example, the first and second conductive bonding portions 510 and 520 may include a conductive adhesive such as a solder or a conductive resin paste and the like. The solder may be Sn—Sb-based, Sn—Ag—Cu-based, Sn—Cu-based, Sn—Bi-based, or the like. The Sn—Sb-based solder may include, for example, Sb in amount of greater than or equal to about 5% and less than or equal to about 15%.

Meanwhile, when the first and second frame terminals 310 and 320 are mounted on the board, a conductive adhesive such as solder or conductive resin paste may be used. Herein, when the first and second frame terminals 310 and 320 are mounted on the board, sides facing the board of the multilayer capacitor 100, for example, third to sixth surfaces including the first surface, may be deteriorated by the flux of solder riding up on the first and second supporting portions 311 and 321 of the first and second frame terminals 310 and 320.

Accordingly, the first supporting portion 311 has a first concave portion 313 disposed between the first mounting portion 312 and the capacitor body 110, and the second supporting portion 321 has a second concave portion 323 disposed between the second mounting portion 322 and the capacitor body 110. In one example, the first concave portion 313 may be disposed between a level of the first mounting portion 312 and a level of the capacitor body 110, and the second concave portion 323 may be disposed between a level of the second mounting portion 322 and a level of the capacitor body 110. The first concave portion 313 may be spaced apart from the first mounting portion 312 and having a distance to the first mounting portion 312 less than a distance from the capacitor boy 110 to the first mounting portion 312, and the second concave portion 323 may be spaced apart from the second mounting portion 322 and having a distance to the second mounting portion 322 less than a distance from the capacitor boy 110 to the second mounting portion 322. For example, the first concave portion 313 may be disposed between the first mounting portion 312 and the other surface of the capacitor body 110 directly facing the first mounting portion 312, and the second concave portion 323 may be disposed between the second mounting portion 322 and the other surface of the capacitor body 110 directly facing the second mounting portion 322.

Herein, the other surface of the capacitor body 110 may be, for example, the first surface of the capacitor body 110. In addition, when the electronic component includes a plurality of multilayer capacitors 100, the other surface of the capacitor body 110 may be the other surface of the capacitor body 110 disposed closest to the first and second mounting portions 312 and 322.

The first and second concave portions 313 and 323 constrain a flux component of solder riding up on the board mounting portion of the first and second frame terminals 310 and 320 to the first and second concave portions 313 and 323 and suppress a flow thereof, so that it is possible to prevent IR deterioration of the side surfaces of the multilayer capacitor 100 facing the substrate due to the diffusion of the flux.

The first and second concave portions 313 and 323 may be disposed on surfaces facing the multilayer capacitor 100 of the first and second supporting portions 311 and 321. Alternatively, the first and second concave portions 313 and 323 may also be disposed on opposite surfaces of the first and second supporting portions 311 and 321 facing the multilayer capacitor 100.

The first and second concave portions 313 and 323 are disposed at regular intervals from the first and second mounting portions 312 and 322. For example, when the first and second concave portions 313 and 323 are connected to the first and second mounting portions 312 and 322, or the first and second concave portions 313 and 323 are disposed over the entire area between the first and second mounting portions 312 and 322 and the first and second conductive bonding portions 510 and 520, a fixing force may be lowered, and thus chips may fall off during reflow. On the other hand, since the first and second concave portions 313 and 323 are disposed at regular intervals from the first and second mounting portions 312 and 322, a sufficient fixing force may be secured. In one example, the first concave portion 313 may be spaced apart from the first mounting portion 312, and the second concave portion 323 may be spaced apart from the second mounting portion 322.

The first and second concave portions 313 and 323 may be separated from the first and second mounting portions 312 and 322 by about 0.1 mm to about 1.0 mm, for example, from about 0.5 mm to about 1.0 mm, or from about 0.8 mm to about 1.0 mm.

In addition, an average height of the first and second concave portions 313 and 323 may be about 4% to about 40%, for example, about 20% to about 40%, about 32% to about 40%, or about 4% to about 32% relative to the average height of the capacitor body 110. Herein, the average height of the first and second concave portions 313 and 323 is an average distance in the Z direction from the first and second mounting portions 312 and 322 to the lowest end of the first and second concave portions 313 and 323, and the average height of the capacitor body 110 is an average distance in the Z-direction from the first and second mounting portions 312 and 322 to the lowest end of the capacitor body 110 disposed at the lowermost end. Herein, the average height of the first and second concave portions 313 and 323 may be, for example, an arithmetic mean value of the height values of the first and second concave portions 313 and 323 which are measured at any 3, 5, or 10 positions disposed at predetermined intervals along the Y direction and the average height of the capacitor body 110 may be, for example, an arithmetic mean value of height values of the capacitor body 110 which are measured at any 3, 5, or 10 positions disposed at predetermined intervals along the Y direction. In one example, an optical microscope or a scanning electron microscope (SEM) may be used to measure an average thickness. The present disclosure is not limited thereto. Other measurement methods or tools recognized by one of ordinary skill in the art may also be used.

When the average height of the first and second concave portions 313 and 323 is less than about 4% relative to the average height of the capacitor body 110, solder flux may be diffused into the first and second frame terminals 310 and 320 during board soldering and thus reliability may be deteriorated, while when it exceeds about 40%, a distance between the lower portion of the capacitor body 110 and the board mounting portion may be increased, thereby increasing the height of the multilayer capacitor 100 and reducing the fixing force.

The first concave portion 313 extends between an area in contact with the first conductive bonding portion 510 and the first mounting portion 312. The second concave portion 323 extends between an area in contact with the second conductive bonding portion 520 and the second mounting portion 322.

For example, the first concave portion 313 may cross both ends of the first supporting portion 311 facing each other in the Y direction, and may completely divide an area in contact with the first conductive bonding portion 510 and the first mounting portion 312. The second concave portion 323 crosses both ends of the second supporting portion 321 facing each other in the Y direction, and may completely divide an area in contact with the second conductive bonding portion 510 and the second mounting portion 322.

As a result, the flux component of the solder riding up on the board mounting portion is reliably constrained by the first and second concave portions 313 and 323 to prevent diffusion into the multilayer capacitor 100.

Figure 5A:
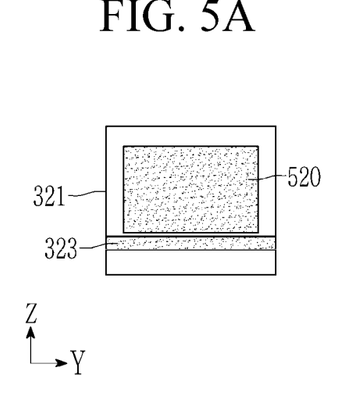
FIGS. 5A and 5B are views respectively showing various shapes of the second concave portion of FIG. 1.
Figure 5B:
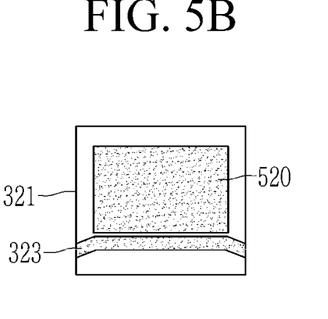

FIGS. 5A and 5B are views respectively showing various shapes of the second concave portion 323 of FIG. 1. FIGS. 5A and 5B are views of the second supporting portion 321 viewed from the X direction in FIG. 1. The first concave portion 313 may also have various shapes like the second concave portion 323 illustrated in FIG. 5.

As shown in FIG. 5A, the second concave portion 323 may have a stripe shape that crosses both ends of the second supporting portion 321 facing each other in the Y direction.

As shown in FIG. 5B, the second concave portion 323 extends between an area in contact with the second conductive bonding portion 520 and the first mounting portion 312 in the middle area contacting the second conductive bonding portion 520, and may have a shape inclined downward in an edge area where the second conductive bonding portion 520 is not disposed. For example, the extending direction of the second concave portion 323 may be the Y direction, and the inclined downward direction may be the Z direction. Also, an angle at which the second concave portion 323 is inclined downward may be an oblique angle.

When the second concave portion 323 has a shape inclined downward from the edge area of the second supporting portion 321, the second concave portion 323 may induce a solder flux to flow down to the outside of the second supporting portion 321 when soldering between the multilayer capacitor 100 and the board, even when it rides up the second frame terminal 320.

The first and second concave portions 313 and 323 may be areas in which surfaces of the first and second supporting portions 311 and 321 are recessed. For example, the first and second concave portions 313 and 323 may have a shape that is wider than a depth. A depth of the first and second concave portions 313 and 323 may be defined as a length in the X direction, and a width of the first and second concave portions 313 and 323 may be defined as a length in the Z direction.

For example, an average width of the first and second concave portions 313 and 323 may be about 200 μm to about 500 μm, or about 200 μm to about 1000 μm.

In addition, an average width of the first and second concave portions 313 and 323 may be about 8% to about 40%, or about 8% to about 20%, relative to the average thickness of the capacitor body 110.

Herein, the average width of the first and second concave portions 313 and 323 may be, for example, an arithmetic mean value of width values of the first and second concave portions 313 and 323 which are measured at any 3, 5, or 10 positions disposed at predetermined intervals along the Y direction, and the average thickness of the capacitor body 110 may be, for example, an arithmetic mean value of thickness values of the capacitor body 110 which are measured at any 3, 5, or 10 positions disposed at predetermined intervals along the Y direction.

When the ratio of the average width of the first and second concave portions 313 and 323 is about 8% to about 40%, defects of the capacitor body 110 and the first and second external electrodes 131 and 132 may be prevented and IR deterioration due to flux components included in the solder may be prevented, as well as by securing a bonding area of the multilayer capacitor 100 and the first and second frame terminals 310 and 320, a fixing force between the multilayer capacitor 100 and the first and second frame terminals 310 and 320 may be secured.

For example, when the first and second concave portions 313 and 323 are formed by removing a portion of the smooth surface of the base portions 310b and 320b of the first and second frame terminals 310 and 320, respectively, or the first and second frame terminals 310 and 320 include first and second inner plating portions 310a and 320a or first and second outer plating portions 310c and 320c, respectively, they may be exposed portions in which the upper plating portions of the first and second inner plating portions 310a and 320a or the first and second outer plating portions 310c and 320c are removed to expose the lower plating portion, or the upper plating portion and the lower plating portions are removed to expose the base portions 310b and 320b. For example, the first and second inner plating portions 310a and 320a having a smooth surface of a portion of the first and second frame terminals 310 and 320 are removed to expose the first and second base portions 310b and 320b and thereby the flux in the vicinity of the multilayer capacitor 100 to the first and second concave portions 313 and 323 is constrained and flow thereof is suppressed.

For example, the base portions 310b and 320b, the first and second inner plating portions 310a and 320a, or the first and second outer plating portions 310c and 320c of the first and second frame terminals 310 and 320 may be removed by mechanical removal such as cutting or polishing, removal by laser trimming, chemical removal by a plating release agent such as with sodium hydroxide, and the like. Alternatively, the following method may also be used: a resist may be applied to a portion for forming the first and second concave portions 313 and 323 in the first and second base portions 310b and 320b of the first and second frame terminals 310 and 320, the first and second inner plating portions 310a and 320a or the first and second outer plating portions 310c and 320c may be formed, and then the resist is removed.

Figure 6:
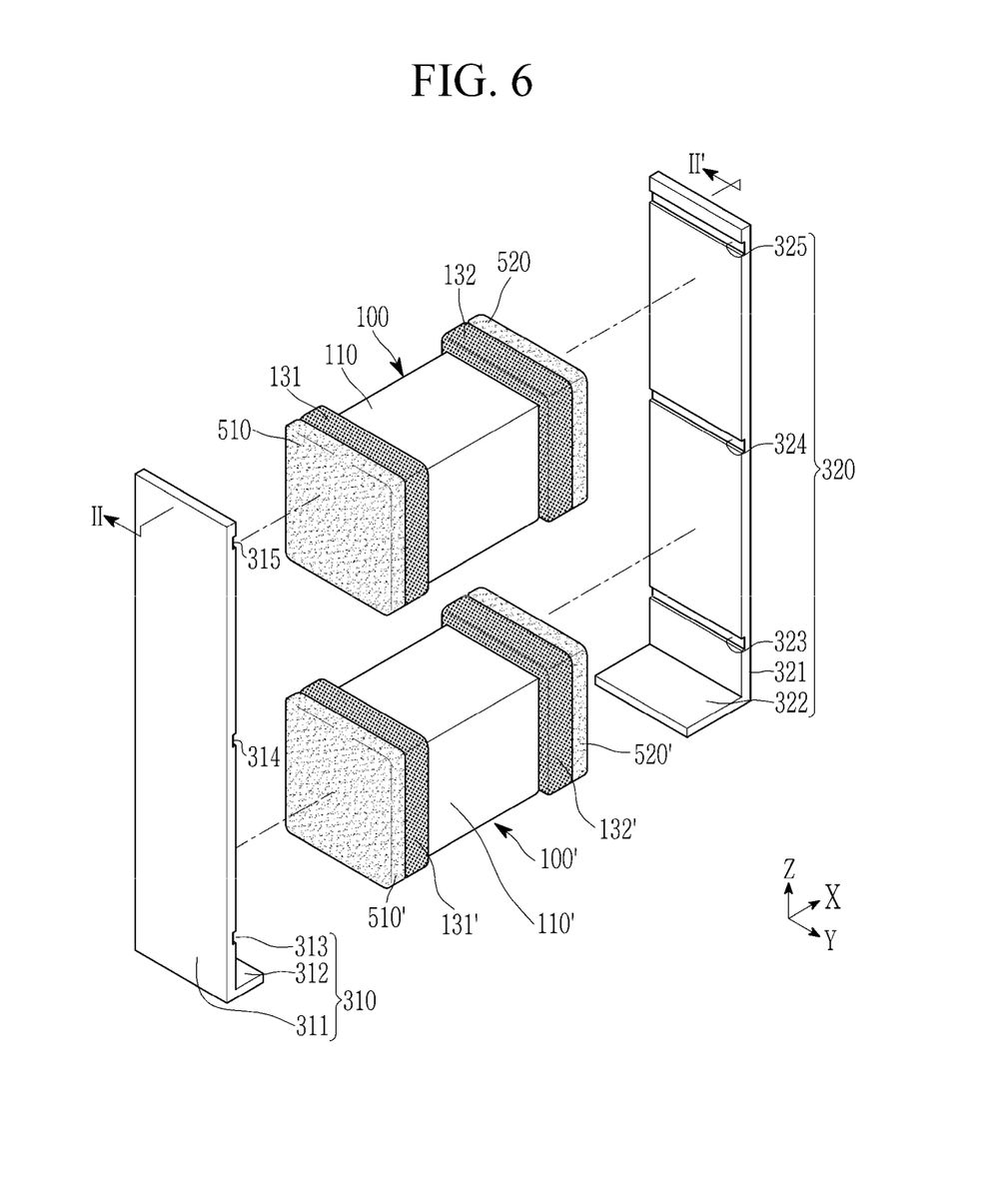
FIG. 6 is a partially exploded perspective view illustrating an electronic component according to another embodiment.
Figure 7:
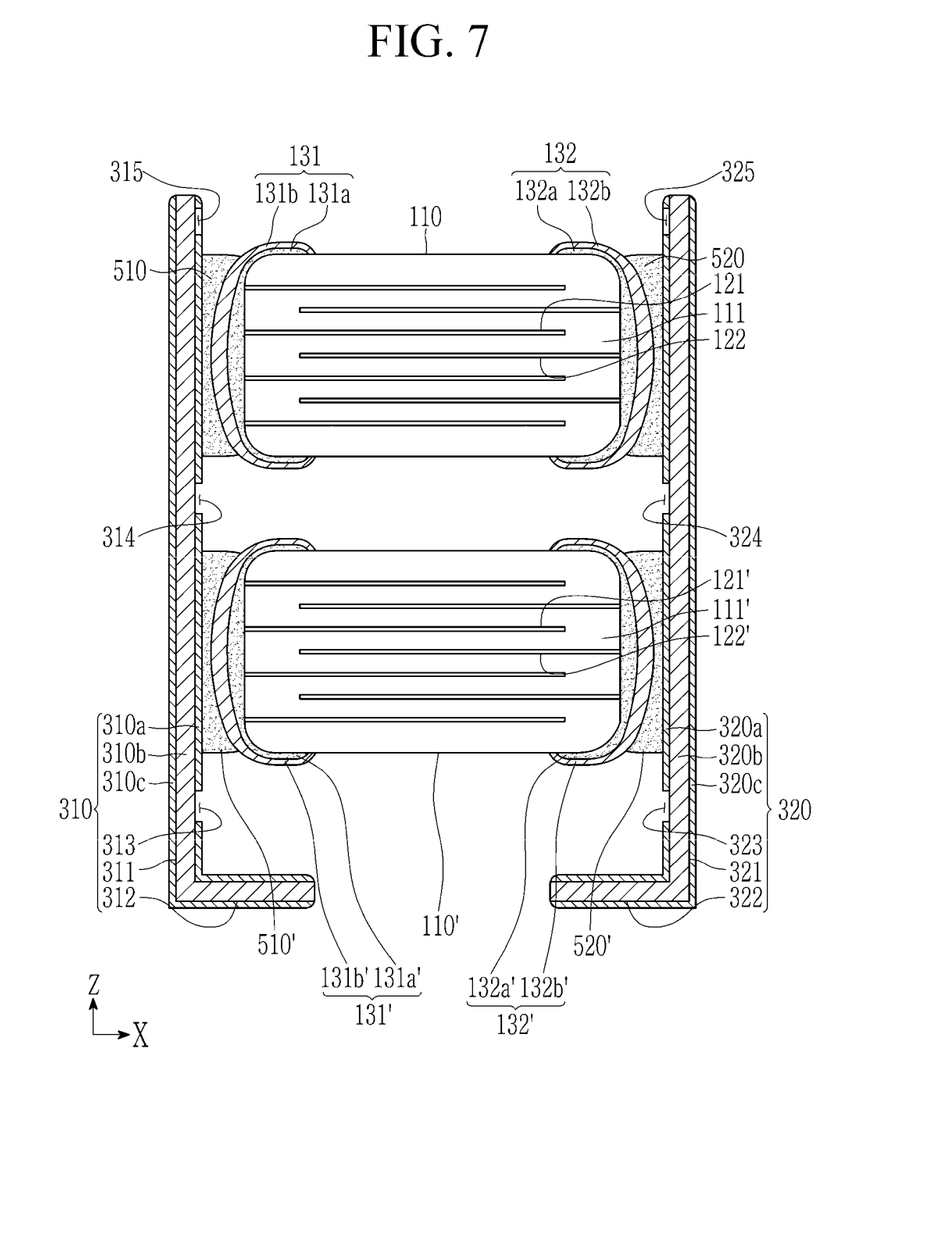
FIG. 7 is a cross-sectional view of the electronic component taken along line II-II' of FIG. 6.

FIG. 6 is a partially exploded perspective view illustrating an electronic component according to another embodiment and FIG. 7 is a cross-sectional view of the electronic component taken along line II-II' of FIG. 6.

Since the electronic component according to the present embodiment is similar to the aforementioned electronic component, overlapping descriptions are omitted, and differences are mainly described. For example, the description of A', in which A is a reference character shown in FIGS. 1 and 2, may be the same as the description of A. Thus, overlapping descriptions are omitted.

FIGS. 1 and 2 illustrate a case in which one multilayer capacitor 100 is included, whereas FIGS. 6 and 7 illustrate a case in which a plurality of multilayer capacitors 100 and 100' are included.

For example, the first and second multilayer capacitors 100 and 100' may be arranged in the Z direction. In this case, the first surface of the first multilayer capacitor 100 and the second surface of the second multilayer capacitor 100' may be disposed to face each other.

Alternatively, the first and second multilayer capacitors 100 and 100' may be disposed in a row in the X direction or in parallel in the Y direction. According to another example, three or more multilayer capacitors may be stacked in the Z direction.

The first multilayer capacitor 100 and the second multilayer capacitor 100' may be disposed to be spaced apart from each other at a predetermined interval. For example, the interval between the first multilayer capacitor 100 and the second multilayer capacitor 100' may be about 0.1 mm to about 1.0 mm in the Z direction.

The multilayer capacitor 100' disposed at the lowest bottom in the Z direction may be disposed at a predetermined distance apart in the Z direction from the first and second mounting portions 312 and 322 of the first and second frame terminals 310 and 320.

The first and second multilayer capacitors 100 and 100' are disposed between the first and second frame terminals 310 and 320.

Accordingly, the electronic component includes a plurality of the first and second conductive bonding portions 510, 510', 520, and 520' respectively disposed between the first and second multilayer capacitors 100 and 100' and the first and second frame terminals 310 and 320.

The plurality of the first conductive bonding portions 510, 510', 520, and 520' may also be arranged in the Z direction at positions corresponding to the first and second multilayer capacitors 100 and 100' or disposed at regular intervals from one another.

Herein, the first supporting portion 311 may have a first concave portion 313 disposed between the first mounting portion 312 and the capacitor body 110', and the second supporting portion 321 may have a second concave portion 323 disposed between the mounting portion 322 and the capacitor body 110'. For example, the first concave portion 313 may be disposed between a level of the first mounting portion 312 and a level of the capacitor body 110', and the second concave portion 323 may be disposed between a level of the mounting portion 322 and a level of the capacitor body 110'. The first concave portion 313 may be spaced apart from the first mounting portion 312 and having a distance to the first mounting portion 312 less than a distance from the capacitor boy 110' to the first mounting portion 312, and the second concave portion 323 may be spaced apart from the second mounting portion 322 and having a distance to the second mounting portion 322 less than a distance from the capacitor boy 110' to the second mounting portion 322. The first concave portion 313 may be disposed between the first mounting portion 312 and the other surface of the capacitor body 110' disposed closest to the first mounting portion 312, and the second concave portion 323 may be disposed between the second mounting portion 322 and the other surface of the capacitor body 110' disposed closest to the second mounting portion 322. Herein, the other surface of the capacitor body 110' may be, for example, the first surface of the capacitor body 110'.

The first and second concave portions 313 and 323 may be disposed on surfaces facing the multilayer capacitor 100 of the first and second supporting portions 311 and 321, and the first and second concave portions 313 and 323 may be disposed at regular intervals from the first and second mounting portions 312 and 322.

The first supporting portion 311 may further include a third concave portion 314 disposed between areas in contact with the plurality of first conductive bonding portions 510 and 510'. Similarly, the second supporting portion 321 may further include a fourth concave portion 324 disposed between areas in contact with the plurality of second conductive bonding portions 520 and 520'.

The first supporting portion 311 may further include a fifth concave portion 315 disposed on an area in contact with the first conductive bonding portion 510 disposed farthest from the first mounting portion 312. Similarly, the second supporting portion 321 may further include a sixth concave portion 325 disposed on an area in contact with the second conductive bonding portion 520 disposed farthest from the second mounting portion 322. Although in the embodiment shown in FIGS. 1-5B, each supporting portion includes one concave portion, the present disclosure is not limited thereto. For example, the fifth concave portion 315 may be included in the first supporting portion 311 and the sixth concave portion 325 may be included in the second supporting portion 321 in the embodiment shown in FIGS. 1-5B.

For example, the fifth concave portion 315 may be disposed on an area in contact with the first conductive bonding portion 510 disposed at the uppermost position in the Z direction, and the sixth concave portion 325 may be disposed on an area in contact with the second conductive bonding portion 520 disposed at the uppermost position in the Z direction. Herein, "on" an area in contact with the first conductive bonding portion 510 or the second conductive bonding portion 520 may refer to a higher area in the Z direction.

The third to sixth concave portions 314, 324, 315, and 325 may be disposed on surfaces facing the first and second multilayer capacitors 100 and 100' of the first and second supporting portions 311 and 321. Alternatively, the third to sixth concave portions 314, 324, 315, and 325 may be disposed on opposite surfaces of the surfaces facing the first and second multilayer capacitors 100 and 100'.

The third concave portion 314 extends between areas in contact with the plurality of first conductive bonding portions 510 and 510' to divide areas in contact with the plurality of first conductive bonding portions 510 and 510'. Similarly, the fourth concave portion 324 extends between areas in contact with the plurality of second conductive bonding portions 520 and 520' to divide areas in contact with the plurality of second conductive bonding portions 520 and 520'.

The fifth concave portion 315 extends along between areas in contact with the uppermost first conductive bonding portion 510 disposed in the Z direction and the upper end of the first supporting portion 311 to divide the areas in contact with the first conductive bonding portion 510 and the upper end of the first supporting portion 311. Similarly, the sixth concave portion 325 extends between areas in contact with the uppermost second conductive bonding portion 520' disposed in the Z direction and the upper end of the second supporting portion 321 to divide the areas in contact with the second conductive bonding portion 520 and the upper end of the second supporting portion 321.

FIGS. 8A-8D are views respectively illustrating various shapes of the second, fourth, and sixth concave portions 323, 324, and 325 of FIG. 6

FIGS. 8A-8D are views of the second mount unit 321 viewed from the X direction in FIG. 6. The first, third, and fifth concave portions 313, 314, and 315 may also have various shapes such as the second, fourth, and sixth concave portions 323, 324, and 325 illustrated in FIGS. 8A-8D.

Figure 8A:
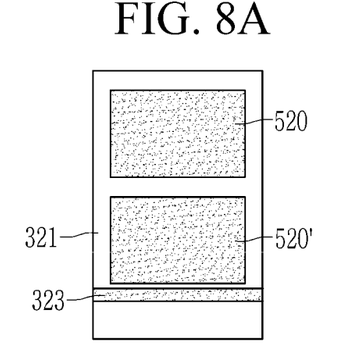
FIGS. 8A-8D are views respectively illustrating various shapes of the second, fourth, and sixth concave portions of FIG. 6.

As shown in FIG. 8A, when the electronic component includes a plurality of second conductive bonding portions 520 and 520', the second supporting portion 321 may include only the second concave portion 323 between the area in contact with the second conductive bonding portion 520' disposed at the lowest end in the Z direction and the second mounting portion 322.

Figure 8B:
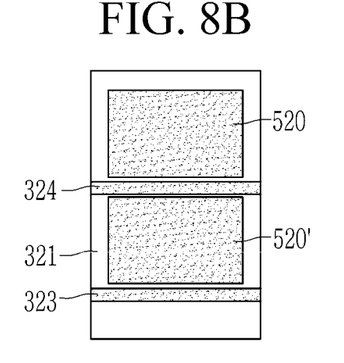

As shown in FIG. 8B, when the electronic component includes a plurality of second conductive bonding portions 520 and 520', the second supporting portion 321 may further include a fourth concave portion 324 disposed between areas in contact with the plurality of second conductive bonding portions 520 and 520', together with the second concave portion 323.

Figure 8C:
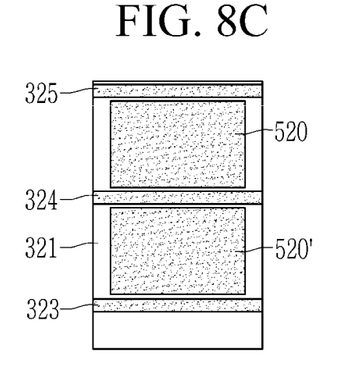

As shown in FIG. 8C, when the electronic component includes a plurality of second conductive bonding portions 520 and 520', the second supporting portion 321 may further include a sixth concave portion 325 on an area in contact with the uppermost second conductive bonding portion 520 disposed in the Z direction, together with the second concave portion 323 and the fourth concave portion 324.

Meanwhile, as shown in FIGS. 8A to 8C, the second, fourth, and sixth concave portions 323, 324, and 325 may have stripe shapes crossing both ends of the second supporting portion 321 facing in the Y direction.

Figure 8D:
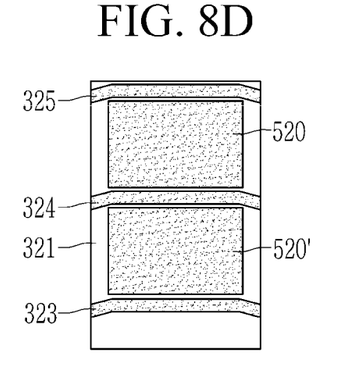

Alternatively, as shown in FIG. 8D, the second, fourth, and sixth concave portions 323, 324, and 325 extend along an area in contact with the plurality of second conductive portions bonding portions 520 and 520' in the middle area in contact with the plurality of second conductive bonding portions 520 and 520', and may have a shape inclined downward in an edge area that is not in contact with the plurality of second conductive bonding portions 520 and 520'. For example, the extending direction of the second, fourth, and sixth concave portions 323, 324, and 325 may be the Y direction, and the inclined downward direction may be the Z direction. In addition, an angle at which the second, fourth, and sixth concave portions 323, 324, and 325 may be an oblique angle inclined downward.

When the second, fourth, and sixth concave portions 323, 324, and 325 have a shape inclined downward in the edge area of the second supporting portion 321, when soldering between the multilayer capacitor 100 and the board, the second, fourth, and sixth concave portions 323, 324, and 325 may induce the solder flux to flow down to the outside of the second supporting portion 321 even when it rides up on the second frame terminal 320.

For example, the third to sixth concave portions 314, 324, 315, and 325 may be areas in which surfaces of the first and second supporting portions 311 and 321 are recessed. As an example, the third to sixth concave portions 314, 324, 315, and 325 may have a shape that is wider than a depth.

Hereinafter, specific embodiments of the disclosure are presented. However, the examples described below are only for specifically illustrating or explaining the disclosure, and the scope of the disclosure is not limited thereto.

[Experimental Example: Performance Test of Electronic Components]

As shown in FIG. 6, the electronic components of Examples 1 to 4, which include two multilayer capacitors (L×W×T=3.2 mm×2.5 mm×2.5 mm), in which first to sixth concave portions were formed on the surfaces of the first and second frame terminal, were manufactured by adjusting the widths (Z direction) of the first and second concave portions as shown in Table 1.

In FIG. 6, an electronic component in which the first to sixth concave portions were not formed on the surface of the frame terminal was manufactured as the electronic component of Comparative Example 1.

In Table 1, the width ratio (%) of the concave portion indicates a length ratio of the average width (Z direction) of the concave portion to the average thickness (Z direction) of the capacitor body, and the height ratio (%) of the concave portion indicates an average distance (Z direction) from the mounting portion to the lowest end of the concave portion relative to an average distance from the mounting portion to the lowest end of the capacitor body (Z direction).

The electronic components according to Examples 1 to 4 and Comparative Example 1 were subjected to a flux residue check, a moisture load resistance test, and a fixing force test, and the results are also shown in Table 1. The size of the multilayer capacitor used was L×W×T=3.2 mm×2.5 mm×2.5 mm, and the quantity was 10 of each.

In order to check the presence of flux residues, the presence or absence of flux residues in the concave portions between the bottom of the multilayer capacitor and the board mounting portion was observed with a digital microscope for each sample. The sample was erected and observed in a direction orthogonal to the side surfaces of the first and second multilayer capacitors. Herein, a light source was placed at 180° opposite to the observation side. A sample of which a flux seeped out more on the inside than portions where the external electrodes of the first and second multilayer capacitors extended toward the main surface or side surface from the cross-section was evaluated as NG.

The moisture load resistance test was performed by applying a rated voltage of 120% of a DC voltage to the first and second multilayer capacitors at 85° C. under humidity of 85% to measure IR, and a sample that IR after 2000 hours was 30% or less (0.5 digit with log) of the initial IR was determined as NG.

In the fixing force test, each manufactured electronic component was mounted on an alumina board by using a SnAgCu-based solder using a reflow method. After applying a load to the sample in a direction perpendicular to the side L dimension ½ and W dimension ½ of the first and second multilayer capacitors, a maximum load until the sample detached from the board was measured as a fixing force.

TABLE 1

|  | Example 1 | Example 2 | Example 3 | Example 4 | Comparative Example 1 |
|---|---|---|---|---|---|
| Average width of concave portion (mm) | 0.1 | 0.2 | 0.5 | 1.0 | 0 |
| Width ratio of concave portion (%) | 4% | 8% | 20% | 40% | — |
| Height ratio of concave portion (%) | 36% | 32% | 20% | 4% | — |
| Flux residue (ea) | 3/10 | 0/10 | 0/10 | 0/10 | 10/10 |
| Number of occurrences of IR deterioration (ea) | 0/10 | 0/10 | 0/10 | 0/10 | 2/10 |
| Fixing force (N) | 110 | 120 | 115 | 117 | 108 |

Referring to Table 1, the concave portion disposed between the lower portion of the multilayer capacitor and the board mounting portion may prevent the flux component contained in the solder used to connect the frame terminals from starting to spread into the multilayer capacitor.

Accordingly, defects occurring in the multilayer capacitor disposed at the bottom may be prevented, and deterioration of IR due to the flux component included in the solder may be prevented.

In addition, when the average width (Z direction) of the concave portion of the frame terminal is about 8% to about 40% relative to the average thickness (Z direction) of the capacitor body, it was confirmed that flux residue was suppressed and fixing force between the multilayer capacitor and the mounting board was sufficiently secured.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. An electronic component, comprising:
   a multilayer capacitor including a capacitor body including a dielectric layer and an internal electrode, and an external electrode disposed on one surface of the capacitor body; and
   a frame terminal having a supporting portion disposed on the external electrode, and a mounting portion disposed at one end of the supporting portion,
   wherein the supporting portion has a concave portion spaced apart from the mounting portion, and
   the concave portion is an area in which the surface of the supporting portion, facing the multilayer capacitor, is recessed with respect to another portion of the support portion such that a thickness of the concave portion is less than a thickness of the another portion of the support portion.

2. The electronic component of claim 1, wherein an average height of the concave portion is about 4% to about 40% relative to an average height of the capacitor body.

3. The electronic component of claim 2, wherein an average width of the concave portion is about 8% to about 40% relative to an average thickness of the capacitor body.

4. The electronic component of claim 1, wherein the electronic component includes a conductive bonding portion disposed between the external electrode and the frame terminal.

5. The electronic component of claim 4, wherein the concave portion extends between an area in contact with the conductive bonding portion of the supporting portion and the mounting portion.

6. The electronic component of claim 5, wherein the concave portion divides an area in contact with the conductive bonding portion of the supporting portion and the mounting portion.

7. The electronic component of claim 4, wherein the concave portion has a shape inclined downward in an edge area not in contact with the conductive bonding portion of the supporting portion.

8. The electronic component of claim 4, wherein the conductive bonding portion comprises solder or a conductive resin paste.

9. The electronic component of claim 1, wherein the concave portion has a shape in which a width is greater than a depth.

10. The electronic component of claim 9, wherein an average width of the concave portion is about 8% to about 40% relative to an average thickness of the capacitor body.

11. The electronic component of claim 1, wherein the frame terminal comprises a base portion and a plating portion disposed on a surface of the base portion, and
the plating portion includes portions separated by the concave portion.

12. The electronic component of claim 11, wherein the plating portion comprises Sn or an alloy including Sn as a main component.

13. The electronic component of claim 1, wherein the concave portion has a distance to the mounting portion less than a distance from the capacitor body to the mounting portion.

14. The electronic component of claim 1, wherein the concave portion extends between two edges of the supporting portion opposing each other.

15. An electronic component, comprising: first and second multilayer capacitors including a capacitor body including a dielectric layer and an internal electrode, and an external electrode disposed on one surface of the capacitor body; and a frame terminal having a supporting portion disposed on the external electrodes, and a mounting portion disposed at one end of the supporting portion, wherein the supporting portion has a first concave portion spaced apart from the mounting portion, and the first concave portion is an area in which the surface of the supporting portion, facing the multilayer capacitor, is recessed with respect to another portion of the support portion such that a thickness of the first concave portion is less than a thickness of the another portion of the support portion.

16. The electronic component of claim 15, further comprising conductive bonding portions disposed between the external electrodes and the frame terminals.

17. The electronic component of claim 16, wherein the supporting portion further comprises a second concave portion disposed between the areas in contact with the conductive bonding portions.

18. The electronic component of claim 17, wherein one or more of the first and second concave portions extend between an area in contact with the conductive bonding portion of the supporting portion and the mounting portion and the one or more of the first and second concave portions have a shape inclined downward in an edge area not in contact with the conductive bonding portion of the supporting portion.

19. The electronic component of claim 17, wherein an average width of one of the first and second concave portions is about 8% to about 40% relative to an average thickness of the capacitor body.

20. The electronic component of claim 17, wherein the frame terminal comprises a base portion and a plating portion disposed on a surface of the base portion, and
the plating portion includes portions separated by the first concave portion.

21. The electronic component of claim 16, wherein the supporting portion further comprises a third concave portion disposed on an area in contact with the conductive bonding portion disposed farthest from the mounting portion.

* * * * *